US012784942B2

(12) United States Patent
Shin et al.

(10) Patent No.: US 12,784,942 B2
(45) Date of Patent: Nov. 3, 2026

(54) THERMAL RESISTANCE DEVICE INCLUDING STRESS CONTROL PATTERN AND MANUFACTURING METHOD THEREOF

(71) Applicant: KOREA ELECTRONICS TECHNOLOGY INSTITUTE, Seongnam-si (KR)

(72) Inventors: Kyu Sik Shin, Seoul (KR); Sung Min Hong, Hanam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 454 days.

(21) Appl. No.: 18/497,644

(22) Filed: Oct. 30, 2023

(65) Prior Publication Data

US 2024/0212891 A1 Jun. 27, 2024

(30) Foreign Application Priority Data

Dec. 27, 2022 (KR) ........................ 10-2022-0185889

(51) Int. Cl.
*H01C 7/00* (2006.01)
*H01C 1/01* (2006.01)

(52) U.S. Cl.
CPC ............... *H01C 7/008* (2013.01); *H01C 1/01* (2013.01)

(58) Field of Classification Search
CPC ...... H01C 7/026; H01C 7/047; H01C 17/075; H10C 17/232; B81B 2001/0207
See application file for complete search history.

(56) References Cited

U.S. PATENT DOCUMENTS 5,798,684 A * 8/1998 Endo .......................... G01J 5/20 338/18
6,762,672 B2 * 7/2004 Taguchi ................... G01K 1/16 374/185
(Continued)

FOREIGN PATENT DOCUMENTS

EP 2711672 A1 * 3/2014 ............. G01F 1/684
JP H10185644 A * 7/1998
(Continued)

OTHER PUBLICATIONS

JP-H10185644 machine translation (Year: 1998).*
(Continued)

*Primary Examiner* — Kyung S Lee
(74) *Attorney, Agent, or Firm* — Knobbe, Martens, Olson & Bear, LLP

(57) ABSTRACT

A thermal resistance device having a vanadium oxide layer and a method of manufacturing the thermal resistance device are proposed. The device may include a stress control pattern that can improve temperature coefficient of resistance (TCR) characteristics. The thermal resistance device may include a support comprising silicon and having an opening formed in a center thereof, and a silicon oxynitride layer formed on the support to cover the opening. The thermal resistance device may also include the stress control pattern formed of a patterned metal material on the silicon oxynitride layer over the opening. The thermal resistance device may further include the vanadium oxide layer formed to cover the stress control pattern and receiving tensile stress from the stress control pattern.

13 Claims, 6 Drawing Sheets

100

(56) References Cited

U.S. PATENT DOCUMENTS

| | | | | |
|---|---|---|---|---|
| 6,884,690 | B2 * | 4/2005 | Behammer | H10D 1/474<br>250/338.2 |
| 10,825,936 | B2 * | 11/2020 | Frey | G01J 5/10 |
| 2019/0243036 | A1 * | 8/2019 | Marcel | C09K 9/00 |
| 2022/0065700 | A1 * | 3/2022 | Yon | G01J 5/046 |

FOREIGN PATENT DOCUMENTS

| | | | |
|---|---|---|---|
| JP | 2015-152597 | A | 8/2015 |
| KR | 10-0925214 | B1 | 11/2009 |
| KR | 10-2010-0039171 | A | 4/2010 |
| KR | 10-1821654 | B1 | 1/2018 |
| KR | 10-2275391 | B1 | 7/2021 |

OTHER PUBLICATIONS

JP 2015152597 machine translation (Year: 2015).*

Office Action received in Korean Application No. 10-2022-0185889, dated Jul. 1, 2024.

* cited by examiner

THERMAL RESISTANCE DEVICE INCLUDING STRESS CONTROL PATTERN AND MANUFACTURING METHOD THEREOF

CROSS REFERENCE TO RELATED APPLICATIONS

The present application claims priority to Korean Patent Application No. 10-2022-0185889 filed Dec. 27, 2022, the entire contents of which are incorporated herein for all purposes by this reference.

BACKGROUND

Technical Field

The present disclosure generally relates to a thermal resistance device and a method of manufacturing the same.

Description of Related Technology

A thermal resistance device is used in a thermal image sensor, a gas sensor, and a temperature sensor such as a bolometer.

The thermal resistance device uses a resistor that converts a temperature change into an electrical signal. The resistor is required to have a large change in resistance with a small change in temperature. Also, the resistor is required to be made of a low-resistance material to reduce noise, that is, Johnson noise.

SUMMARY

One aspect is a thermal resistance device having a vanadium oxide layer and including a stress control pattern capable of improving temperature coefficient of resistance (TCR) characteristics, and to a method of manufacturing the thermal resistance device.

Another aspect is a thermal resistance device that includes a support based on silicon and having an opening formed in a center thereof; a silicon oxynitride layer formed on the support to cover the opening; a stress control pattern formed of a patterned metal material on the silicon oxynitride layer over the opening; and a vanadium oxide layer formed to cover the stress control pattern and receiving tensile stress from the stress control pattern.

The vanadium oxide layer may be formed of $VO_x$ ($1.94 \le x \le 1.97$).

The metal material of the stress control pattern may include at least one of Ti and V.

An area occupied by the stress control pattern in a region where the stress control pattern is formed may be 40 to 60%.

The stress control pattern may be patterned to be long in length and small in width and thickness under the vanadium oxide layer.

The stress control pattern may have a Peano curve structure.

The thermal resistance device may have a temperature coefficient of resistance (TCR) of 2.7% or more.

The thermal resistance device may further include a first protective layer formed to protect the vanadium oxide layer; an electrode layer formed on the first protective layer and electrically connected to the vanadium oxide layer while passing through the first protective layer; a second protective layer formed to protect the electrode layer; an infrared absorption layer formed on the second protective layer over the vanadium oxide layer; and a bonding wire electrically connecting a portion of the electrode layer exposed outside the second protective layer to an external connection terminal.

A material of the silicon oxynitride layer may include SiONO.

A material of the first and second protective layers may include silicon nitride.

A material of the electrode layer may include aluminum.

Another aspect is a method of manufacturing a thermal resistance device that includes preparing a support substrate in which a silicon oxynitride layer is formed on a support based on silicon; forming a stress control pattern by depositing and patterning a metal layer on the silicon oxynitride layer; and forming a vanadium oxide layer to cover the stress control pattern.

According to the present disclosure, in the thermal resistance device, the stress control pattern formed under the vanadium oxide layer provides tensile stress to the vanadium oxide layer, thereby improving the temperature coefficient of resistance (TCR) characteristics of the thermal resistance device.

DETAILED DESCRIPTION

Figure 1:
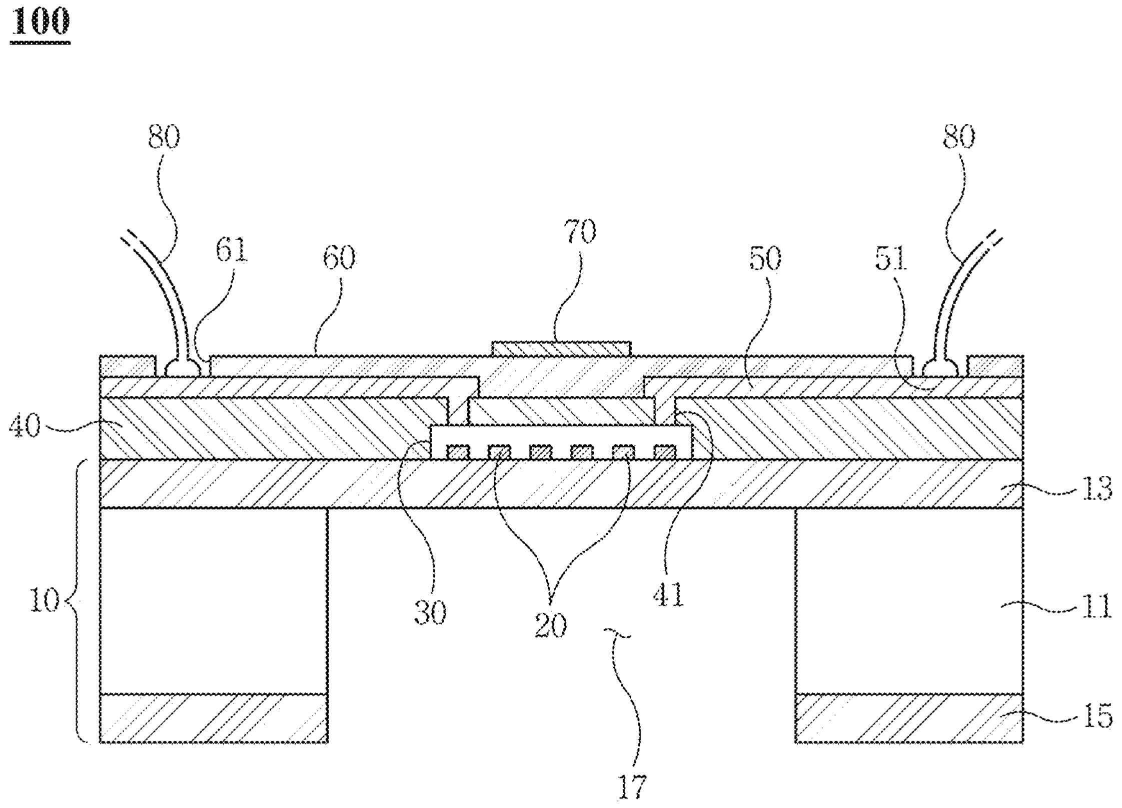
FIG. 1 is a cross-sectional view showing a thermal resistance device including a stress control pattern according to an embodiment of the present disclosure.

As the resistor, vanadium oxide, which has a relatively large temperature coefficient of resistance (TCR) and enables a low temperature process, is mainly used. Vanadium oxide exhibits a large change in resistivity because it has metal-to-insulator transition (MIT) characteristics at a specific temperature.

However, vanadium oxide shows a decrease in TCR characteristics when compressive stress is applied to a lower layer. To solve this problem, a low-stress silicon oxynitride (SiONO) substrate is used. The silicon oxynitride (SiONO) layer, which is the lower layer of the vanadium oxide layer, has low stress characteristics, but since the stress is locally different, compressive stress applied to the vanadium oxide layer reduces the TCR characteristics.

Now, embodiments of the present disclosure will be described in detail with reference to the accompanying drawings.

However, in the following description and the accompanying drawings, well known techniques may not be described or illustrated in detail to avoid obscuring the subject matter of the present disclosure. Through the drawings, the same or similar reference numerals denote corresponding features consistently.

The terms and words used in the following description, drawings and claims are not limited to the bibliographical meanings thereof and are merely used by the inventor to enable a clear and consistent understanding of the disclosure. Thus, it will be apparent to those skilled in the art that the following description about various embodiments of the present disclosure is provided for illustration purpose only and not for the purpose of limiting the disclosure as defined by the appended claims and their equivalents.

Figure 2:
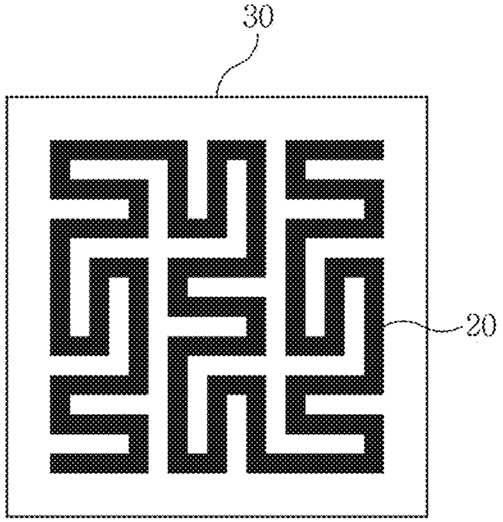
FIG. 2 is a plan view showing a stress control pattern formed under a vanadium oxide layer of FIG. 1.

FIG. 1 is a cross-sectional view showing a thermal resistance device including a stress control pattern according to an embodiment of the present disclosure. FIG. 2 is a plan view showing a stress control pattern formed under a vanadium oxide layer of FIG. 1.

Referring to FIGS. 1 and 2, the thermal resistance device 100 according to the embodiment includes a vanadium oxide layer 30. In addition, the thermal resistance device 100 has a stress control pattern 20 formed under the vanadium oxide layer 30 to provide tensile stress to the vanadium oxide layer 30 and thereby improve the temperature coefficient of resistance (TCR) characteristics.

The thermal resistance device 100 according to the embodiment includes a support 11, a silicon oxynitride layer 13, the stress control pattern 20, and the vanadium oxide layer 30. The support 11 is based on silicon and has an opening 17 formed in the center thereof. The silicon oxynitride layer 13 is formed on the top of the support 11 to cover the opening 17. The stress control pattern 20 is formed on the silicon oxynitride layer 13 over the opening 17 by patterning a metal material. The vanadium oxide layer 30 is formed to cover the stress control pattern 20 and receives tensile stress from the stress control pattern 20.

According to the embodiment, by forming the stress control pattern 20 that provides tensile stress at the bottom of the vanadium oxide layer 30, it is possible to improve the temperature coefficient of resistance (TCR) of the thermal resistance device 100.

In addition, the thermal resistance device 100 according to the embodiment may further include a first protective layer 40, an electrode layer 50, a second protective layer 60, an infrared absorption layer 70, and a bonding wire 80.

Hereinafter, the thermal resistance device 100 according to the embodiment will be described in detail.

The support 11 and the silicon oxynitride layer 13 may be provided as a support substrate 10. The support substrate 10 may have a structure in which silicon oxynitride layers 13 and 15 are formed on both sides of the support 11.

The silicon oxynitride layers 13 and 15 formed on both sides of the support 11 include the first silicon oxynitride layer 13 formed on the upper surface of the support 11, and the second silicon oxynitride layer 15 formed on the lower surface of the support 11. The vanadium oxide layer 30 is formed on the first silicon oxynitride layer 13.

The opening 17 is formed in the central portion of the support substrate 10. The opening 17 may be formed by etching a corresponding portion of the support 11 under the first silicon oxynitride layer 13 through the lower surface of the support substrate 10, that is, through the second silicon oxynitride layer 15. The lower surface of the first silicon oxynitride layer 13 is exposed through the opening 17.

The support 11 may be a wafer made of silicon. The thickness of the support 11 may be 100 to 500 μm.

The first and second silicon oxynitride layers 13 and 15 are based on $Si_xO_yN_z$ material and may be formed of, for example, a low-stress SiONO material. The thickness of the first and second silicon oxynitride layers 13 and 15 may be 6,000 to 10,000 Å.

The stress control pattern 20 and the vanadium oxide layer 30 are formed on the first silicon oxynitride layer 13 exposed to the opening 17. That is, the stress control pattern 20 is formed on the first silicon oxynitride layer 13, and the vanadium oxide layer 30 is formed on the first silicon oxynitride layer 13 to cover the stress control pattern 20.

The stress control pattern 20 may be formed by depositing a metal layer on the first silicon oxynitride layer 13 and then patterning the metal layer. At least one of Ti and V may be used as a material of the metal layer. The metal layer may be formed through physical or chemical vapor deposition. The area occupied by the stress control pattern 20 in a region where the stress control pattern 20 is formed may be 40 to 60%.

The stress control pattern 20 provides tensile stress to the vanadium oxide layer 30 through its material and pattern structure, thereby allowing the temperature coefficient of resistance (TCR) characteristics of the thermal resistance device 100 to be improved. According to the embodiment, the thermal resistance device 100 including the stress control pattern 20 has a temperature coefficient of resistance (TCR) of 2.7% or more. For example, the stress control pattern 20 may have a Peano curve structure. When the stress control pattern 20 was formed in a Peano curve structure using Ti, the temperature coefficient of resistance (TCR) was measured to be 2.8%.

In each of Comparative Example 1, Comparative Example 2, and Experimental Example, the vanadium oxide layer 30 was formed on the first silicon oxynitride layer 13 with an area of 250×250 Å. The vanadium oxide layer 30 was commonly formed to have a thickness of 1,000 Å on the first silicon oxynitride layer 13 with a thickness of 8,000 Å.

In Comparative Example 1, the vanadium oxide layer 30 was formed directly on the first silicon oxynitride layer 13.

In Comparative Example 2, after a metal layer made of Ti was formed on the first silicon oxynitride layer 13, the vanadium oxide layer 30 was formed directly on the metal layer without patterning.

In Experimental Example, as in the embodiment, a metal layer made of Ti was formed on the first silicon oxynitride layer 13 and patterned as a Peano curve structure to form the stress control pattern 20, and then the vanadium oxide layer 30 was formed to cover the stress control pattern 20.

The tensile stress of the thermal resistance device according to Comparative Example 1 was measured as 370 MPa.

The tensile stress of the thermal resistance device according to Comparative Example 2 was measured as 372 MPa. That is, it can be seen that there is almost no difference in stress between Comparative Examples 1 and 2.

On the other hand, the tensile stress of the thermal resistance device according to Experimental Example was measured as 460 MPa. That is, it is determined that the stress control pattern 20 formed by patterning the metal layer into a Peano curve structure provides tensile stress to the vanadium oxide layer 30.

The thermal resistance devices according to Comparative Examples 1 and 2 were measured to have a temperature coefficient of resistance (TCR) of 2.6%. On the other hand, the temperature coefficient of resistance (TCR) of the thermal resistance device according to Experimental Example was measured to be 2.76%.

The vanadium oxide layer 30 is formed to cover the stress control pattern 20. The vanadium oxide layer 30 is formed of $VO_x$ ($1.94 \leq x \leq 1.97$). The vanadium oxide layer 30 may have a thickness of 800 to 1,200 Å.

Because the stress control pattern 20 is formed within the vanadium oxide layer 30, its thickness is smaller than that of the vanadium oxide layer 30. The stress control pattern 20 may be patterned to be long in length and small in width and thickness to effectively provide tensile stress to the vanadium oxide layer 30.

The first protective layer 40 is formed on the entire upper surface of the support substrate 10 to protect the vanadium oxide layer 30 from the external environment. That is, the first protective layer 40 is formed to cover the first silicon oxynitride layer 13 and the vanadium oxide layer 30. The first protective layer 40 has a first connection hole 41 through which the electrode layer 50 can be connected to the vanadium oxide layer 30. A portion of the vanadium oxide layer 30 is exposed to the outside of the first protective layer 40 through the first connection hole 41. Silicon nitride ($SiN_x$) may be used as a material of the first protective layer 40. The thickness of the first protective layer 40 may be 8,000 to 12,000 Å.

The first connection hole 41 may be formed near the edge of the vanadium oxide layer 30 in order to minimize the influence on the vanadium oxide layer 30 by the electrode layer 50 formed on the first protective layer 40.

The electrode layer 50 is formed on the first protective layer 40 and is electrically connected to the vanadium oxide layer 30 through the first connection hole 41. The electrode layer 50 may be formed of aluminum material. The thickness of the electrode layer 50 may be 2,000 to 4,000 Å.

The second protective layer 60 is formed on the entire upper surface of the support substrate 10 to protect the electrode layer 50 from the external environment. That is, the second protective layer 60 is formed to cover the first protective layer 40 and the metal layer. The second protective layer 60 has a second connection hole 61 through which the bonding wire 80 can be connected to the electrode layer 50. An electrode pad 51, which is a portion of the electrode layer 50, is exposed to the outside of the second protective layer 60 through the second connection hole 61. Silicon nitride ($SiN_x$) may be used as a material of the second protective layer 60. The thickness of the second protective layer 60 may be 2,000 to 4,000 Å.

The infrared absorption layer 70 is formed on the second protective layer 60 over the vanadium oxide layer 30 so that the vanadium oxide layer 30 can respond sensitively to external temperature changes.

The bonding wire 80 electrically connects the electrode pad 51 of the electrode layer 50 exposed to the second connection hole 61 to an external connection terminal (not shown). The bonding wire 80 may use, as a material thereof, gold (Au), aluminum (Al), copper (Cu), or the like.

As described above, according to the embodiment, the stress control pattern 20 is formed under the vanadium oxide layer 30 to provide tensile stress to the vanadium oxide layer 30, thereby improving the temperature coefficient of resistance (TCR) characteristics of the thermal resistance device 100 including the vanadium oxide layer 30.

Hereinafter, a method of manufacturing the thermal resistance device 100 according to the embodiment will be described with reference to FIGS. 1 to 12. FIGS. 3 to 12 are views showing respective steps in a method of manufacturing the thermal resistance device 100 including the stress control pattern 20 according to an embodiment of the present disclosure.

The thermal resistance device 100 can be manufactured using a MEMS (micro-electro mechanical systems) process used in a semiconductor manufacturing process. Layers on the support substrate 10 can be formed using a physical or chemical vapor deposition process. For patterning of such layers, a photoetching process via a photoresist film can be used.

Figure 3:
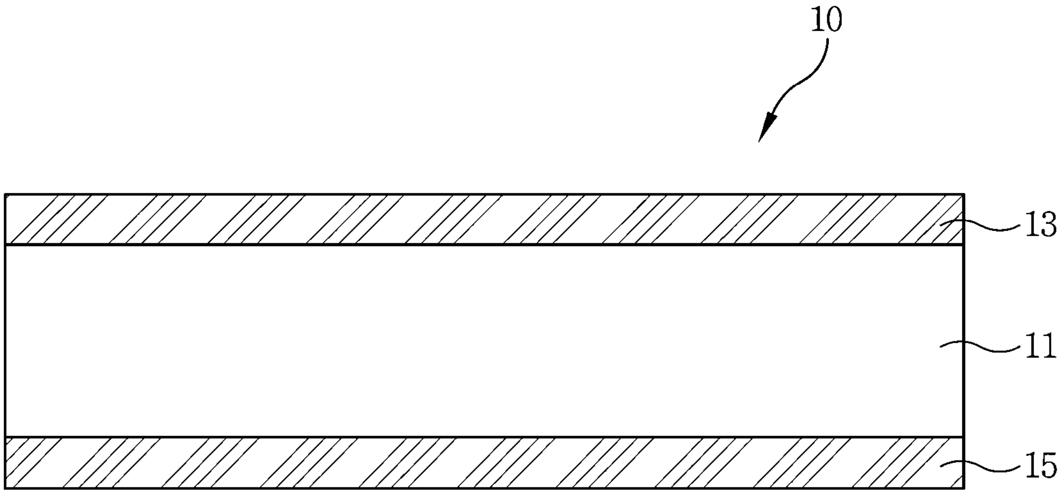
FIGS. 3 to 12 are views showing respective steps in a method of manufacturing a thermal resistance device including a stress control pattern according to an embodiment of the present disclosure.

First, as shown in FIG. 3, a support substrate 10 is prepared. The support substrate 10 has a structure in which first and second silicon oxynitride layers 13 and 15 are formed on both sides of a support 11 made of silicon, respectively.

Figure 4:
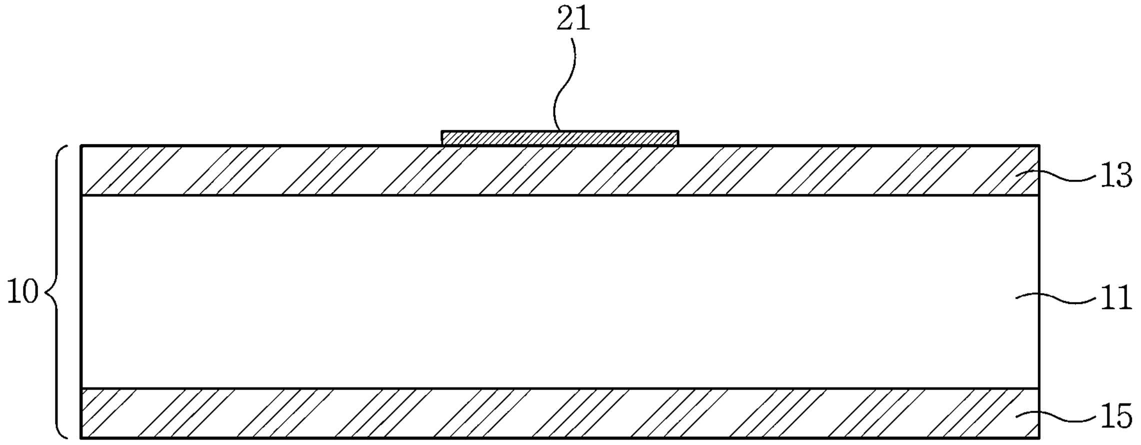

Next, as shown in FIG. 4, a metal layer 21 is formed on the first silicon oxynitride layer 13. At least one of Ti and V may be used as a material of the metal layer 21.

Figure 5:
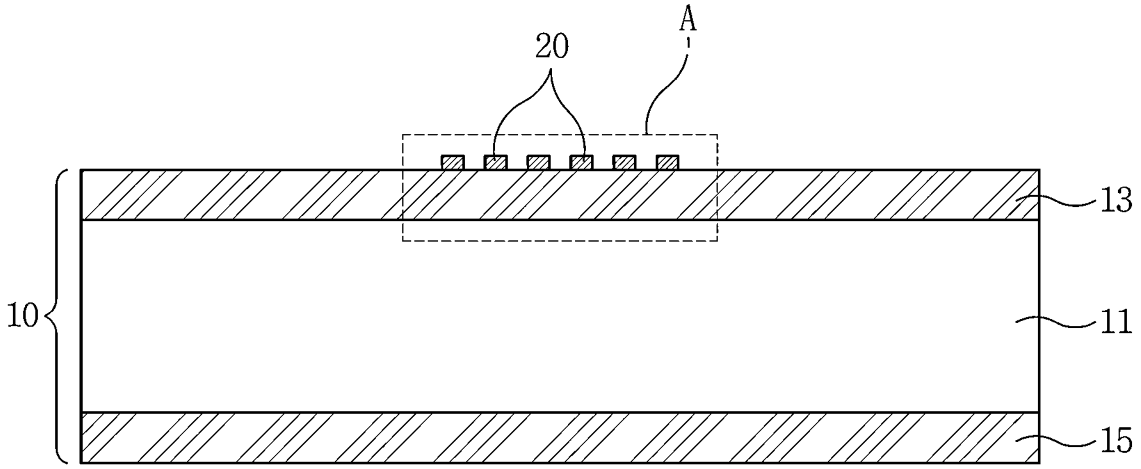
Figure 6:
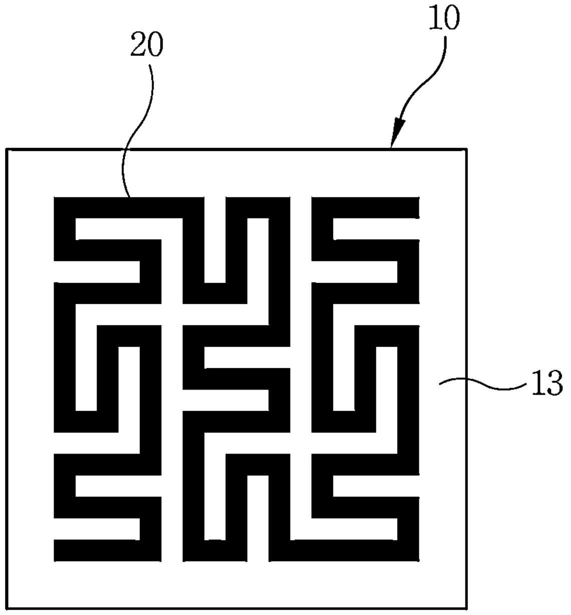

Next, as shown in FIGS. 5 and 6, a stress control pattern 20 is formed through a process of patterning the metal layer (21 in FIG. 4). In the embodiment, the stress control pattern 20 is formed, for example, but not limited to, in a Peano curve structure.

Figure 7:
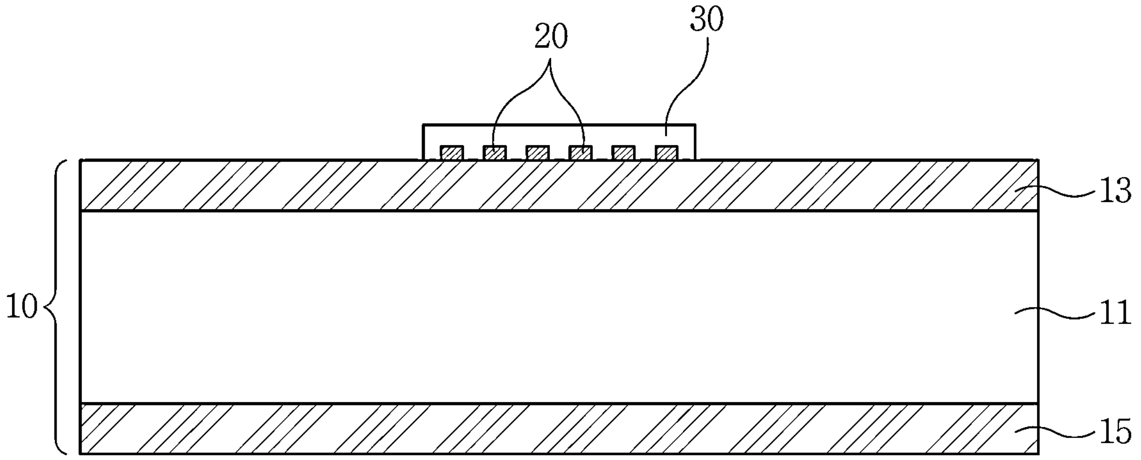

Next, as shown in FIG. 7, a vanadium oxide layer 30 is formed on the first silicon oxynitride layer 13 to cover the stress control pattern 20. The stress control pattern 20 is located within the vanadium oxide layer 30. The tensile stress generated by the stress control pattern 20 is directly transferred to the vanadium oxide layer 30.

Figure 8:
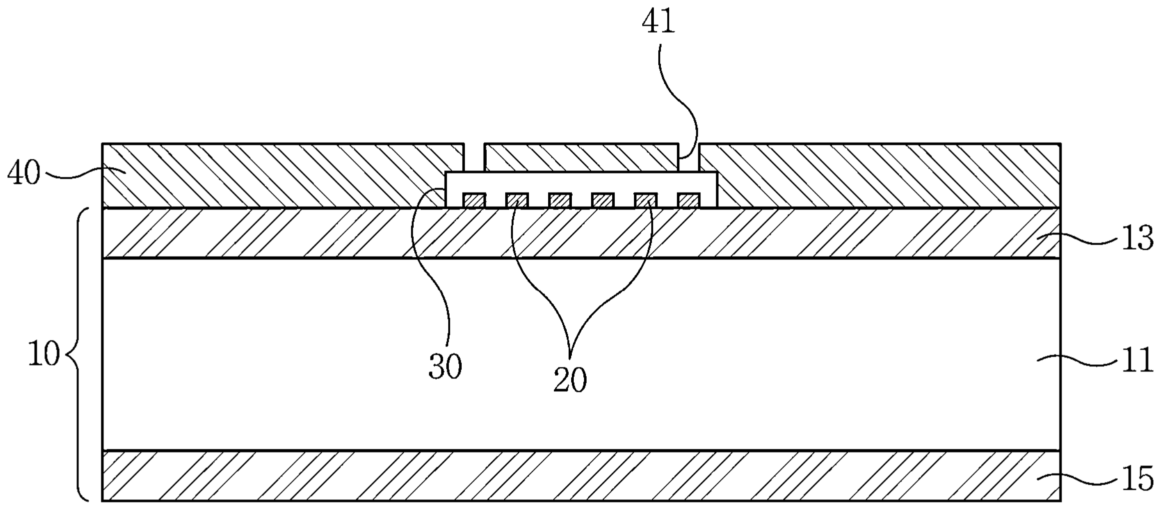

Next, as shown in FIG. 8, a first protective layer 40 is formed to cover the entire upper surface of the support substrate 10 and protect the vanadium oxide layer 30 from the external environment. That is, the first protective layer 40 is formed to cover the first silicon oxynitride layer 13 and the vanadium oxide layer 30.

Then, patterning of the first protective layer 40 forms a first connection hole 41 through which an electrode layer 50 can be connected to the vanadium oxide layer 30. The first connection hole 41 is formed near the edge of the vanadium oxide layer 30, and a portion of the vanadium oxide layer 30 is exposed to the outside of the first protective layer 40 through the first connection hole 41.

Figure 9:
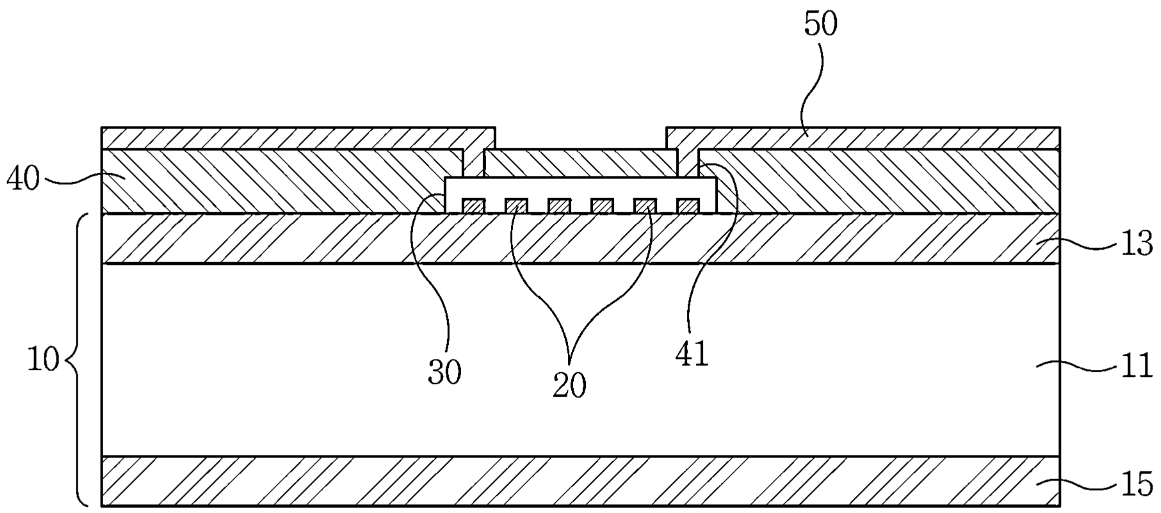

Next, as shown in FIG. 9, the electrode layer 50 is formed on the first protective layer 40. The electrode layer 50 is electrically connected to the vanadium oxide layer 30 through the first connection hole 41. The electrode layer 50 is formed by forming an electrode metal layer on the first protective layer 40 through a deposition process and then patterning the electrode metal layer. One end of the electrode layer 50 is connected to the vanadium oxide layer 30 through the first connection hole 41, and the other end is wired toward the outside of the vanadium oxide layer 30.

Figure 10:
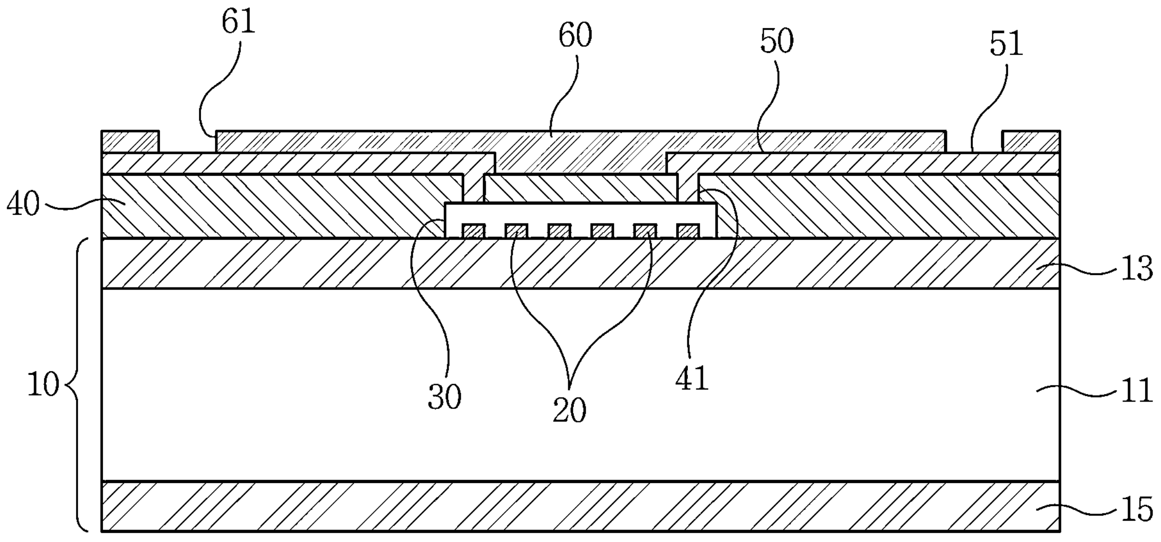

Next, as shown in FIG. 10, a second protective layer 60 is formed to cover the entire upper surface of the support substrate 10 and protect the electrode layer 50 from the external environment. That is, the second protective layer 60 is formed to cover the first protective layer 40 and the electrode layer 50. Then, patterning of the second protective layer 60 forms a second connection hole 61 through which a bonding wire 80 can be connected to the electrode layer 50. An electrode pad 51 of the electrode layer 50 is exposed to the outside through the second connection hole 61.

Here, the electrode pad 51 of the electrode layer 50 may be formed near the edge of the upper surface of the second protective layer 60. The reason will be explained later in the wire bonding process.

Figure 11:
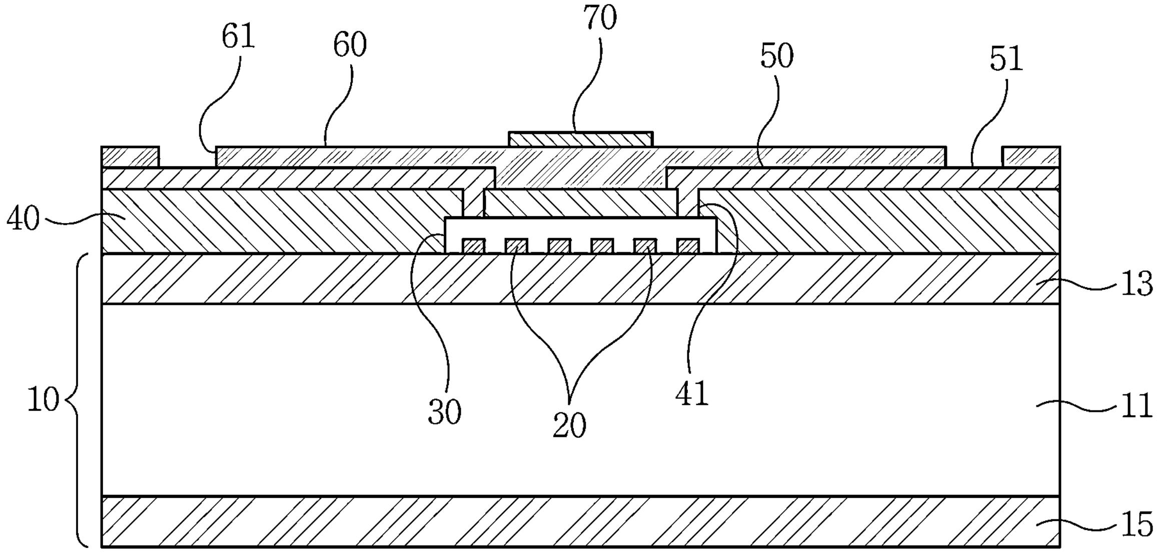

Next, as shown in FIG. 11, an infrared absorption layer 70 is formed on the second protective layer 60 over the vanadium oxide layer 30.

Figure 12:
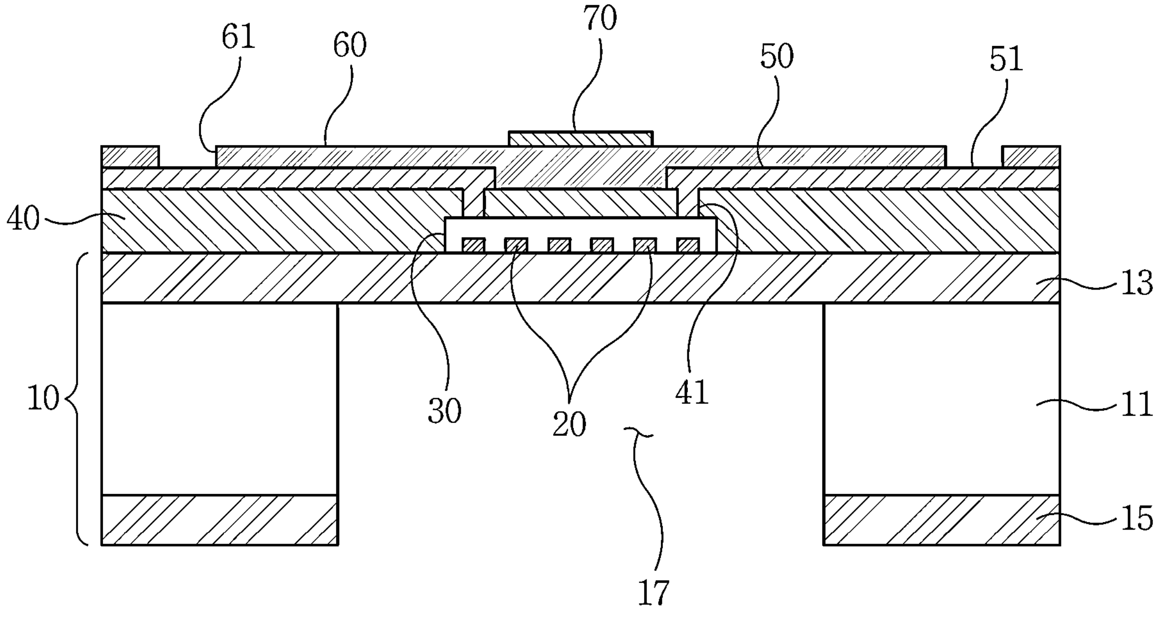

Next, as shown in FIG. 12, the second silicon oxynitride layer 15 and the support 11 residing under the vanadium oxide layer 30 are etched to form an opening 17. As a result, the lower surface of the first silicon oxynitride layer 13 under the vanadium oxide layer 30 is exposed through the opening 17. Also, the electrode pad 51 of the electrode layer 50 is located on the first silicon oxynitride layer 13 spaced apart from the opening 17.

Thereafter, as shown in FIG. 1, the electrode pad 51 of the electrode layer 50 exposed to the second connection hole 61 is electrically connected to an external connection terminal (not shown) through a bonding wire 80. As a result, the thermal resistance device 100 according to the embodiment is obtained.

Meanwhile, the electrode pad 51 of the electrode layer 50 is formed on a portion of the first silicon oxynitride layer 13 outside the opening 17 so that it can be stably supported by the support 11. Normally, the process of bonding the bonding wire 80 to the electrode pad 51 causes a load. So, if the electrode pad 51 is formed on a portion of the first silicon oxynitride layer 13 within a region of the opening 17, the vanadium oxide layer 30 located thereunder may be damaged during the wire bonding process. For this reason, the electrode pad 51 of the electrode layer 50 is formed to be located outside the opening 17. As a result, the electrode pad 51 is supported by the support 11 and the first and second silicon oxynitride layers 13 and 15 that constitute the support substrate 10.

While the present disclosure has been particularly shown and described with reference to an exemplary embodiment thereof, it will be understood by those skilled in the art that various changes in form and details may be made therein without departing from the scope of the present disclosure as defined by the appended claims.

What is claimed is:

1. A thermal resistance device comprising:
- a support having an opening formed in a center thereof, the support comprising silicon;
- a silicon oxynitride layer formed on the support to cover the opening;
- a stress control pattern comprising a patterned metal material on the silicon oxynitride layer over the opening, wherein the stress control pattern is configured to impart tensile stress; and
- a vanadium oxide layer covering and embedding the stress control pattern and configured to receive tensile stress from the stress control pattern, the vanadium oxide layer being configured to receive tensile stress from the stress control pattern so as to increase a temperature coefficient of resistance (TCR).

2. The thermal resistance device of claim 1, wherein the vanadium oxide layer comprises VOx, where x is from 1.94 to 1.97.

3. The thermal resistance device of claim 2, wherein the metal material of the stress control pattern includes at least one of Ti or V.

4. The thermal resistance device of claim 3, wherein an area occupied by the stress control pattern in a region where the stress control pattern is formed is 40% to 60%.

5. The thermal resistance device of claim 3, wherein the stress control pattern has a length longer than a width and a thickness thereof, and wherein the stress control pattern is disposed under the vanadium oxide layer.

6. The thermal resistance device of claim 3, wherein the stress control pattern has a Peano curve structure.

7. The thermal resistance device of claim 6, wherein the thermal resistance device has a temperature coefficient of resistance (TCR) of 2.7% or more due to tensile stress imparted by the stress control pattern.

8. The thermal resistance device of claim 1, further comprising:
- a first protective layer formed to protect the vanadium oxide layer;
- an electrode layer formed on the first protective layer and electrically connected to the vanadium oxide layer while passing through the first protective layer;
- a second protective layer formed to protect the electrode layer;
- an infrared absorption layer formed on the second protective layer over the vanadium oxide layer; and
- a bonding wire electrically connecting a portion of the electrode layer exposed outside the second protective layer to an external connection terminal.

9. The thermal resistance device of claim 8, wherein a material of the silicon oxynitride layer includes SiONO, a material of the first and second protective layers includes silicon nitride, and a material of the electrode layer includes aluminum.

10. A method of manufacturing a thermal resistance device, comprising:
- preparing a support substrate in which a silicon oxynitride layer is formed on a silicon support;
- forming a stress control pattern by depositing and patterning a metal layer on the silicon oxynitride layer, the stress control pattern being configured to generate tensile stress; and
- forming a vanadium oxide layer to cover and embed the stress control pattern, such that tensile stress is transferred from the stress control pattern to the vanadium oxide layer.

11. The method of claim 10, wherein the vanadium oxide layer comprises VOx, where x is from 1.94 to 1.97.

12. The method of claim 11, wherein a metal material of the stress control pattern includes at least one of Ti and V.

13. The method of claim 12, wherein the stress control pattern has a Peano curve structure.

* * * * *